Dec. 28, 1937.  W. G. HARTWIG  2,103,529
AUTOMATIC CONTROL FOR BURNERS
Filed April 9, 1934  2 Sheets—Sheet 1
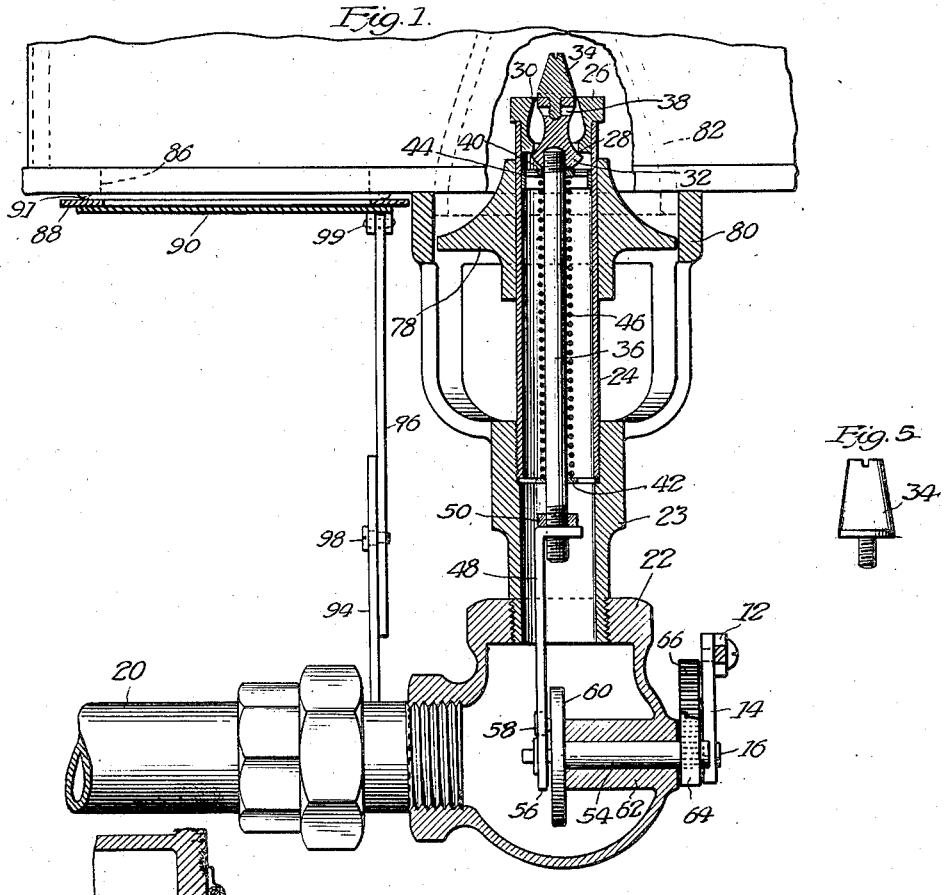
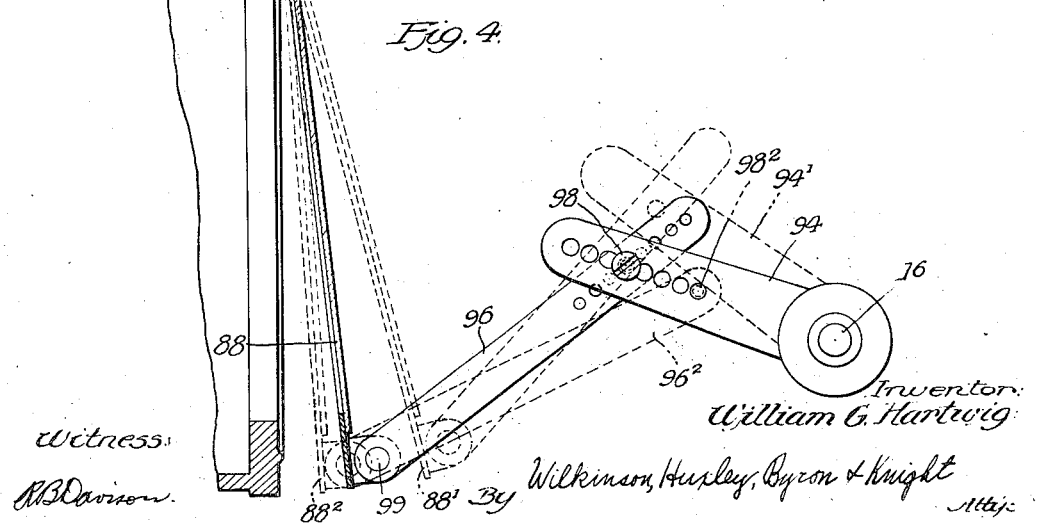
Inventor:
William G. Hartwig
By Wilkinson, Huxley, Byron & Knight
Attys.
Witness:
R. B. Davison.

Dec. 28, 1937.  W. G. HARTWIG  2,103,529
AUTOMATIC CONTROL FOR BURNERS
Filed April 9, 1934   2 Sheets-Sheet 2
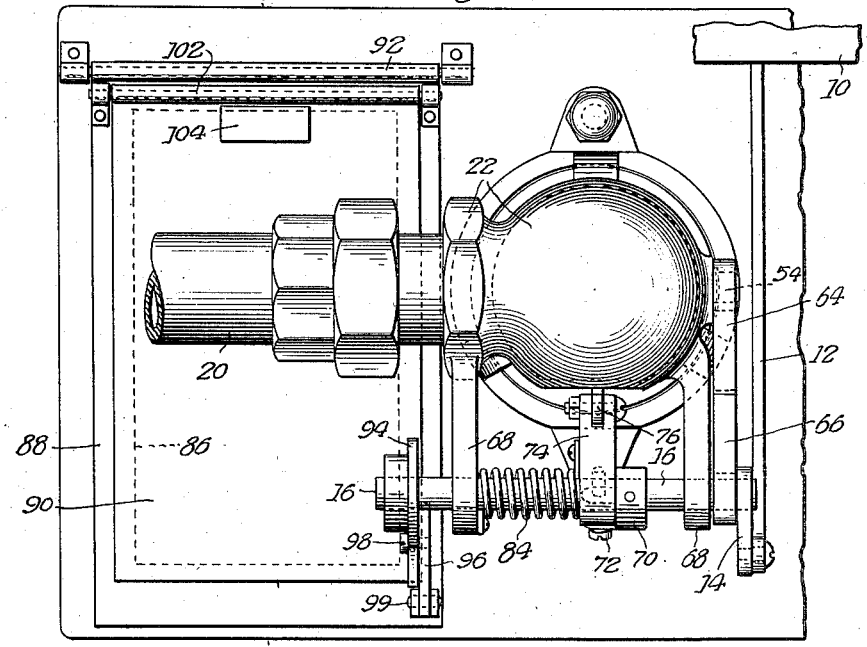
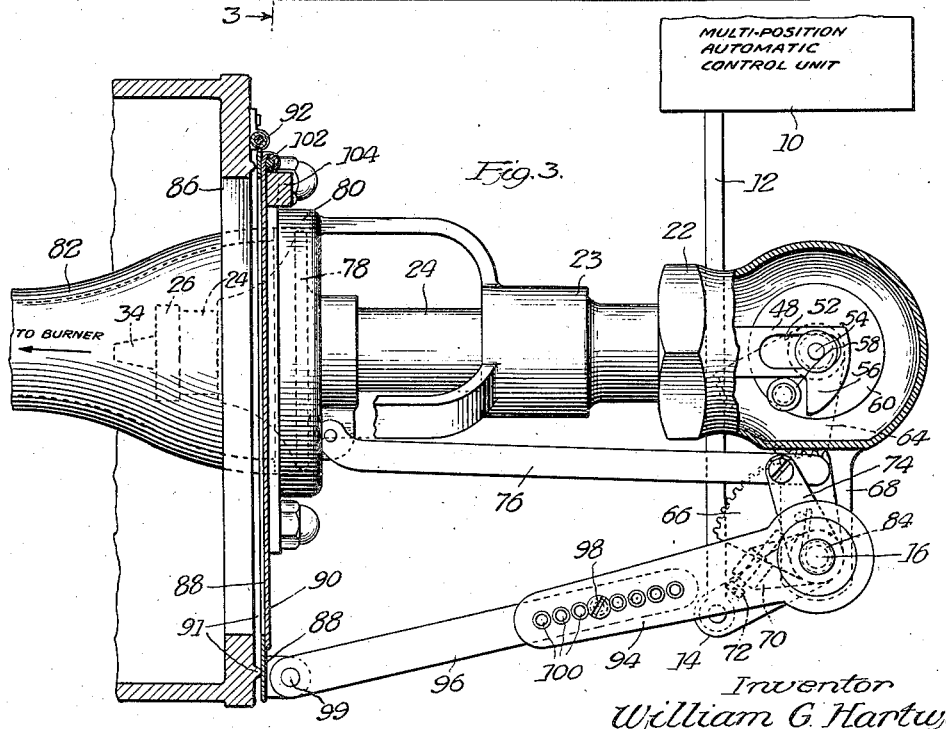
Inventor
William G. Hartwig
By Wilkinson, Huxley, Byron & Knight
Attys.
Witness:
R. B. Davison Patented Dec. 28, 1937

2,103,529

UNITED STATES PATENT OFFICE 2,103,529

AUTOMATIC CONTROL FOR BURNERS

William G. Hartwig, Chicago, Ill., assignor to Railway Utility Co., Chicago, Ill., a corporation of Illinois Application April 9, 1934, Serial No. 719,627

2 Claims. (Cl. 158—119)

This invention relates to automatic control for burners and has been illustrated as including a novel type of gas valve, a primary air valve, and a secondary air valve, all operated together in a novel way. The gas valve is really made up of two cone valves in series, one acting merely as a shut-off valve and the other as a modulating valve. The secondary valve is provided with operating levers which may be adjusted to open it various amounts, but which exactly close it with all adjustments. There is also provided a special hinged blow-out panel to prevent explosions from extinguishing the pilot light, although with proper adjustment there would never be any explosions.

In my copending application, Serial Number 660,112, now Patent No. 1,985,535, I have disclosed apparatus for automatically governing a gas burner, which may burn continuously, so as to modulate it according to the amount of heat which is required. The present invention is an improvement on said invention or on features disclosed in said application to make the apparatus as a whole more reliable and efficient.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts, Figure 1 is a plan view of the apparatus partly in section;

Figure 2 is a rear view of the structure shown in Figure 1;

Figure 3 is an elevational view from the left of Figures 1 and 2, partly sectional along the line 3—3 of Figure 2, minus the gas-supply pipe and having the valve elbow broken away.

Figure 4 is a fragmentary and somewhat diagrammatic view of the secondary air control features in the first operated position; and Figure 5 is a view of an alternative valve cone which may be used with the structure in Figure 1.

Although my invention may take many forms, only one has been chosen for illustration. According to this illustrated form of the invention, the valves are controlled by an automatic control unit 10 of any desired type, but preferably one which has not only a valve closing position but a plurality of successive valve opening positions. For example, it may be constructed as shown in my co-pending application Serial Number 660,112, now Patent No. 1,985,539. Instead of being connected to the valve in the manner illustrated in the said patent it is here illustrated as operating the valves through a connecting rod 12 and a suitable crank 14 keyed to the shaft 16.

Gas is supplied to the system through a conduit which may include the supply pipe 20, the valve elbow 22, and the valve tube 24, at the furnace end of which are located the gas valves. According to some aspects of the invention these valves may be of any form, but the preferred form which comprises one aspect of the invention is best illustrated in Figure 1. In this form there is a valve seat member 26 firmly secured to the tube 24 and having two spaced fuel openings, namely, a first fuel opening defined by a seat 28 and a second fuel opening defined by another portion 30 which may be called a seat though in fact it may never be touched by the valve cone; also a flaring chamber through which the fuel passes from one opening to the other. The valve cone has two portions 32 and 34. The valve cone 32 provides a rearwardly flaring or overhanging first closure which engages the seat 28 with a firm gas-tight contact, the cone and seat being preferably ground to fit. The portion 34 has a bulbous form, the major diameter of which coacts with and forms a closure for the second opening 30; also a rearwardly tapering neck which is within the enlarged cavity of the seat member 26 and connects the bulb with the first closure 32. The seat 28 has a relatively thin contact edge so as to be able to cut through any soft substance which may lodge between it and the forwardly tapering valve cone 32. The valve cone 32 is shaped so as to give a maximum gas passage with only a short movement.

The valve cone 34 is a modulating valve and preferably does not quite contact the seat 30. This puts the entire closing pressure on valve 32. It is preferred that it be truly conical and forwardly tapering in shape through the length of its effective portion and it withdraws into a bulbous recess having walls substantially conforming to it, so as to give a substantially uniform increase in gas flow throughout its movement.

The valve cone 32 is preferably screwed onto the valve stem 36, and the valve cone 34 is screwed into the valve cone 32. The transverse hole 38 in the valve cone 32 is simply an opening for inserting a suitable tool with which to tighten the cone 32 onto the valve stem 36, or to make other adjustment.

The valve stem 36 may be kept centered with respect to the valve tube 24 by means of guides 40 and 42. The guide 40 may be the central hub and spoke portion of a ring 44 slidably carried in the tube 24 and the guide 42 may be a member comprising hub and spokes alone, the spokes resting on pipe 23 as shown in Figure 1. A spring 46 may be provided surrounding the valve stem 36, resting against guide 42 and pressing against sliding guide 40 so as to press the valve cones 32 and 34 toward their closed positions shown in Figure 1. The end of the valve stem 36 may be screwed into a connecting bar 48 and secured in position as by a lock nut 50. A slot 52 (Figure 3) is formed in the rear end of the connecting bar 48 and fits over the end of a shaft 54. The connecting bar 48 also has formed in its end a dog 56 which is engaged by a roller 58 carried by a disk 60 keyed to the end of the shaft 54. As shown, there may be a little lost motion between the roller 58 and the dog 56 to permit a partial movement of the air valves before the gas valve is opened.

The shaft 54 is carried by the gas-tight bushing 62 and has keyed on its outer end a gear segment 64 by which it is rotated. The gear segment 64 meshes with another gear segment 66 which is keyed to the shaft 16 and through it is turned by the crank 14 and the connecting rod 12. The shaft 16 may be supported in any suitable manner, as by lugs 68 depending from the valve elbow 22. Keyed to this shaft is a crank lever 70 having therein a screw 72 which engages a second crank lever 74 which is mounted for free rotation on the shaft 16. To the end of lever 74 is pivoted a connecting link 76 which at its front end is pivoted to a primary air valve 78. The primary air valve 78 is slidably carried by the valve tube 46 and cooperates with a valve collar 80 (which might be called a valve seat, though there is no contact) to control the primary supply of air to the burner. The mixing tube or burner pipe 82 may fit into the collar 80 as shown. As the shaft 54 is rotated by the connecting rod 12 and the crank 14, the crank lever 70 and the screw 72 cause the rotation of the crank lever 74 and the consequent opening of the primary air valve 78. The air valve is closed by a spring 84 which constantly urges the crank lever 74 in a valve closing direction.

It has been found that the best results with the burner having a modulated control as shown herein are obtained by having an automatically controlled secondary air inlet. In devising means for adjusting the control of the secondary air supply, one consideration is that the damper must close with reasonable accuracy when the apparatus is in the closed position, regardless of the adjustment. Another consideration is that the adjustment must be accurate and delicate, at least as to the first two or three of the open positions, or, in short, for all positions which correspond with a minimum or low burner flame. Under these conditions the supply of air must ordinarily be controlled by varying the size of the air inlet. This necessity does not appear to be as great when the burner flame is large, perhaps because it then has the strength to draw in the approximately proper amount of air without much change in the air inlet, at least if there is a proper initial design of the furnace and flues. Another consideration is that, at least with the gas and primary air valve as shown, the secondary air valve must move further for the second step than for the first. According to the present invention, a secondary air inlet 86 is provided with a damper which comprises a damper frame 88 and a blow-out panel 90. The damper frame may close on a rib 91 extending around the inlet 86. Except as will be described hereinafter, these two damper members operate in unison, swinging vertically by the upper hinges 92.

Without proper control there is either too much cold air passing through the furnace when the flame is low or out, or there is not enough oxygen for the best combustion when the flame is high. Obviously the passage of an excess of cold air through a furnace involves the loss of heat, and it may effect the combustion unfavorably, as by causing flare-backs or explosions when the gas is turned on or off. In the illustrated form of the invention the damper frame 88 is operated from the shaft 16 by a crank lever 94 keyed thereto, and a connecting bar 96 pivoted to the crank lever 94 by a pin 98 and also pivoted to the bottom of the damper frame 88 by a pin 99. When the damper is closed the crank lever 94 and connecting bar 96 are aligned as shown in Figure 3. The two levers are provided with a series of coinciding holes 100 through any coinciding pair of which the pin 98 may be passed. In whichever coinciding pair of holes the pin 98 is positioned the damper will close with nice precision when the crank lever 94 and connecting bar 96 are in the straightened out position shown in Figure 3. However, when the shaft 16 turns the crank lever 94 to the first open position (shown in dotted lines in Figure 4) or to any other position different from that shown in Figure 3, the position of the connecting bar 96 and therefore of the damper will depend upon which of the coinciding holes the pin 98 was placed in. By placing a pin in the holes successively further to the left, as seen in Figure 3, the damper will be opened successively further for given movements of the crank lever 94, and by shifting the pin successively to coinciding pairs of holes toward the right in Figure 3 the damper will be opened successively less for each of the same movements of the crank lever 94.

Perhaps it should be mentioned that the holes 100 in link 96 are slightly smaller than in crank 94 and the pin 98 has an enlarged shank so that it is secured firmly to link 96 and exerts no pinching action on the crank 94.

With the control unit 10 adjusted as at present contemplated, the shaft 16 would be rotated about 34° in its first movement, and about 17° in each subsequent movement. The first movement is made larger than the others to facilitate making the adjustments and so as to take up any slack in the parts. It also has the advantage of giving the secondary air damper 88 a substantial movement, although the first 17° rotation of the shaft 16 would give the damper very little movement since the crank lever 94 would start from dead center.

Figure 4 shows the crank 94 rotated 34° to its second position, i. e. to the first open position. This is shown in full lines as is also the corresponding position of the damper 88 when the pin 98 is in the set of holes shown in Figure 3. In short, the full lines of Figure 4 represent the structure shown in Figure 3 when the shaft 16 is rotated 34°. The dotted lines 94' represent the next position of the crank 94, and the dotted lines 88' represent the corresponding position of the damper 88. It should be noticed that the movement of the damper 88 is slightly greater between the second and third positions than between the first and second positions, even though the shaft 16 is rotated twice as far between the first and second positions as between the second and third positions. Likewise, although this has not been shown, the movement of the damper between the third and fourth positions would be even greater than between the second and third positions. This has been found to give the best results.

The effect of changing the position of the pin 98 has also been shown in Figure 4. Assuming that the pin were moved to the position $98^2$ i. e., to the righthand set of holes 100, and assuming that the crank 94 were in its second position, as shown in full lines in Figure 4, the link 96 would be in the position shown by the dotted lines $96^2$ and the damper would be in the position shown by the dotted lines $88^2$. Thus with the pin 98 in the position $98^2$ the damper would move less for each movement of the crank 94 than with the pin in its full line position. However, the ratio of the successive movements would be substantially the same regardless of the position of the pin 98.

Through misuse it is conceivably possible that an explosion would occur in the furnace. To minimize the danger or inconvenience from this source, the blow-out panel 90 is furnished, being hinged to the damper frame 88, as by a hinge 102. This blow-out panel is preferably held closed only by gravity, and opens outwardly as shown so as to give a ready escape for any exploded gases within the furnace. The chief need for this provision is to prevent the pilot light from being extinguished by the pressure resulting from explosion. It is therefore very desirable that the blow-out panel 90 open easily in spite of closing reliably. Both ends are accomplished by use of the weight 104 located near the top of the panel 90. In this position it has a relatively high closing torque but adds very little to the inertia of the panel. The weight should be as small as will reliably close the panel in the absence of air currents.

Operation

In view of the foregoing description and the drawings, the operation of the device need be only briefly described. As the connecting rod 12 is raised to successive positions by the automatic control unit 10, it turns the shafts 16 and 54 which are connected through the gear segments 64 and 66. The shaft 54, by means of the eccentrically mounted pin 58, draws back the gas valve cones 32 and 34, the valve cone 32 opening the main shut-off, and the valve cone 34 regulating the passage of gas to the burner, the amount of gas supply being increased for each of the successive upward movements of the connecting rod 12. The shaft 16 through the crank lever 70, adjustment screw 72 and screw lever 74 and connecting lever 76 draws back the primary air valve 78 to allow successively more air into the burner pipe 82 with each of said upward movements of the connecting rod 12. The shaft 16 also opens the secondary air damper 88 by turning the crank lever 94 to which is pivoted the connecting bar 96 which is also pivoted to the damper. As shown in Figure 4 the movement of the damper is greater for the second movement than for the first, this having been found to give the best results.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. In a burner, a fuel conduit having rear and forward openings and an enlarged connecting chamber through which the fuel must pass from one of said openings to the other to reach the point of ignition, a rearwardly flaring first closure member coacting with and arranged to seat against the walls of the rear opening, and a flow-modulating second closure member moving simultaneously with said first closure member and coacting with said forward opening; said modulating closure member having a bulbous portion tapering rearwardly from said forward opening to a reduced neck within the enlarged chamber and presenting its rearwardly tapering portion to the fuel flowing through said enlarged chamber.

2. In a burner, a controllable fuel valve, a primary air passage having a valve movable with said fuel valve and controlling the volume ratio of air mixed with fuel delivered thereto, a secondary air passage adapted to deliver air for promoting combustion of the fuel mixture, a secondary air valve controlling the volume ratio of secondary air supplied to the burner, and a valve-moving means having connections through which it moves all of said valves through a range of movements that positions all of said valves in substantially closed position or in a plurality of open and successively more open positions, and means whereby the connection through which said valve-moving means opens the secondary air valve imparts to said secondary air valve opening movements, the ratio of which to the opening movements of the fuel valve are progressively amplified, so that the volume ratio of secondary air supply to the fuel supply is materially greater as the volume of fuel supply increases.

WILLIAM G. HARTWIG.